United States Patent [19]

Palaniappan

[11] Patent Number: 4,687,982
[45] Date of Patent: Aug. 18, 1987

[54] INSTANT REVERSING CIRCUIT

[75] Inventor: Rasappa Palaniappan, Rockford, Ill.

[73] Assignee: PT Components, Inc., Milwaukee, Wis.

[21] Appl. No.: 834,208

[22] Filed: Feb. 27, 1986

[51] Int. Cl.$^4$ .............................................. H02P 1/42
[52] U.S. Cl. .................................... 318/763; 318/778; 318/786
[58] Field of Search ..................... 361/82, 23, 84, 77; 318/763, 764, 258, 798, 806, 778, 786, 794, 795, 373

[56] References Cited

U.S. PATENT DOCUMENTS

| | | | |
|---|---|---|---|
| 2,886,756 | 5/1959 | Schaefer | 318/763 |
| 3,421,064 | 1/1969 | Phillips | 318/786 |
| 3,518,491 | 6/1970 | Downs | 361/82 |
| 3,525,904 | 8/1970 | Ringstad | 361/82 |
| 3,671,830 | 6/1972 | Kruper | 318/786 |
| 3,792,324 | 2/1974 | Suarez et al. | 318/786 |
| 4,375,613 | 3/1983 | Fuller et al. | 318/786 |
| 4,438,382 | 3/1984 | Vuckovich et al. | 318/763 |

Primary Examiner—David Smith, Jr.
Attorney, Agent, or Firm—Andrus, Sceales, Starke & Sawall

[57] ABSTRACT

In a single phase AC motor having a main winding (1) and an auxiliary winding (2) both connectable to an AC power source (4), and having a start switch (24, 49) for automatically connecting and disconnecting the auxiliary winding to and from the AC source (4) in starting and running modes, respectively, and having a user operated reversing switch (7-12) for reversing the voltage polarity applied from the AC source (4) to one of the windings relative to the other winding, circuitry is provided for detecting the polarity reversal by sensing when one of the main and auxiliary winding voltages shifts from a leading to a lagging position relative to the other winding voltage, whereupon the circuit automatically instantly reconnects the auxiliary winding (2) to the AC source (4) to immediately apply reverse torque. A reinitiation signal (140, 141) is generated during each cycle of the AC source (4) until the motor speed is reduced to zero, to thus repeatedly apply reverse torque to the motor until it can accelerate in the opposite direction of rotation. The detection of the polarity reversal is instantaneous, depending only on sensed phase shift. The application of reverse torque is substantially instantaneous, depending only on discharge time of an initiation capacitor (55).

14 Claims, 5 Drawing Figures

INSTANT REVERSING CIRCUIT

BACKGROUND AND SUMMARY

The invention relates to a system for quickly reversing the direction of rotation of a single phase AC electric motor.

When trying to quickly reverse a single phase AC motor, the mere reversal of voltage polarity applied to the main and auxiliary windings of the motor while it is running will not reverse the motor. That is, the applied voltage to the main winding reverse polarity each half cycle, regardless of whether it is positive during the first or second half cycle, and without interaction with the auxiliary winding, no reversal can take place.

One possibility for reversing the motor is to stop the motor, and then reenergize the start winding in the opposite polarity relative to the main winding, or vice versa. This would make the motor rotate in the opposite direction. This method of stopping the motor before reversal is undesirable or unacceptable in various applications where instant reversal while running in a certain direction is needed or desired, for example an electric hoist motor.

In another known reversing system, a mechanical centrifugal disconnect switch is used in combination with a mechanical reversing switch manually operated by the user. The user operated reversing switch controls a first set of external switches for applying a first polarity voltage to the start winding from the AC source, and controls a second set of external switches for applying a second opposite polarity voltage to the start winding from the AC source. The centrifugal switch is normally closed at initial energization of the motor, to connect the start winding to the AC power source. The centrifugal switch automatically opens when the motor speed is approximately 80% of synchronous speed, causing the start winding to be disconnected from the AC power source. The centrifugal switch has two pairs of contacts, a first pair for supplying current through the start winding in one direction when its associated set of external switches are closed, and a second pair of contacts for supplying current through the start winding in the opposite direction when its associated set of external switches are closed. At initial energization of the motor, both pairs of contacts are closed and one set of external switches is closed, to supply current in one direction through the start winding. As the motor starts to rotate, a wiper actuator is frictionally dragged by motor rotation to a first given position adjacent the first pair of contacts, and when the centrifugal actuator operates, it causes the wiper actuator to open the first pair of centrifugal switch contacts to disconnect the start winding from the AC power source. During the running mode, when the operator manually actuates the external reversing switches, a different electrical circuit is completed, which is through the closed second pair of centrifugal switch contacts, to supply current through the start winding in the opposite direction and hence apply reverse torque to the motor. As the motor slows down, the centrifugal switch closes which in turn moves the wiper actuator axially and closes the first pair of centrifugal switch contacts which are now in an open circuit. When the motor starts rotating in the opposite direction, the wiper actuator is frictionally dragged to a second position adjacent the second pair of centrifugal switch contacts. When the motor speed reaches approximately 80% of synchronous speed in such opposite direction of rotation, the centrifugal switch opens which in turn moves the wiper actuator axially to open the second pair of contacts and disconnect the start winding from the AC power source. The cycle may repeat, with the operator manually actuating the external reversing switches to complete an electrical circuit through the first pair of contacts. This type of switching arrangement is typically known in the trade as an "iron fireman" arrangement. Another example is a General Electric Reverswitch R98-1, 8422. Such arrangement provides instant reversing (i.e., immediate application of reverse torque) because the wiper actuator has been moved by rotation of the motor in its running condition to be ready and in the proper position for motor reversal. While this type of arrangement has proven useful for its intended purpose, it is nonetheless subject to the problems inherent in a mechanical type actuation system, including limited life, excessive contact arching due to random switching, fatigue, friction, particularly the dragging of the wiper actuator, vibration, mounting position, contact and wiper actuator wear, and so on.

The present invention addresses and solves the above noted single phase motor instant reversing and other problems in a particularly simple and effective electronic system electrically sensing polarity reversal and automatically reconnecting the start winding to the AC source. A particularly desirable feature of the invention is that the instant reversing technique is independent of the single phase motor speed at which the reversing switch is operated by the user. For example, the operator of a hoist can go instantly from up to down without having to momentarily delay the reversing switch in a central off position before continuing to the reversed direction position. In the present invention, polarity reversal is instantly detected and recognized by sensing when one of the main and auxiliary winding voltages shifts from a leading to a lagging position relative to the other, and the start winding is instantly reconnected to the AC source such that the reversed polarity between the main and start windings begins applying reverse torque to the motor, slowing the motor down and accelerating it in the opposite direction of rotation.

Another desirable feature of the invention is that an initiation driver pulse which triggers connection of the start winding to the AC source is reapplied during each cycle of the AC source until the motor speed decreases to zero, to thus repeatedly insure application of reverse torque. This is particularly desirable for high inertia loads where it may not be possible to quickly reverse the single phase AC motor or reduce its speed to zero.

Detailed Description

A single phase AC motor has a main winding for running the motor, and a start or auxiliary winding for starting the motor wherein the auxiliary winding is energized when starting the motor from rest and then disconnected at a given motor speed. The fields in the main and auxiliary windings are phase shifted, for example by capacitance, inductance, resistance or the like, to establish starting and/or running torque.

Figure 1:
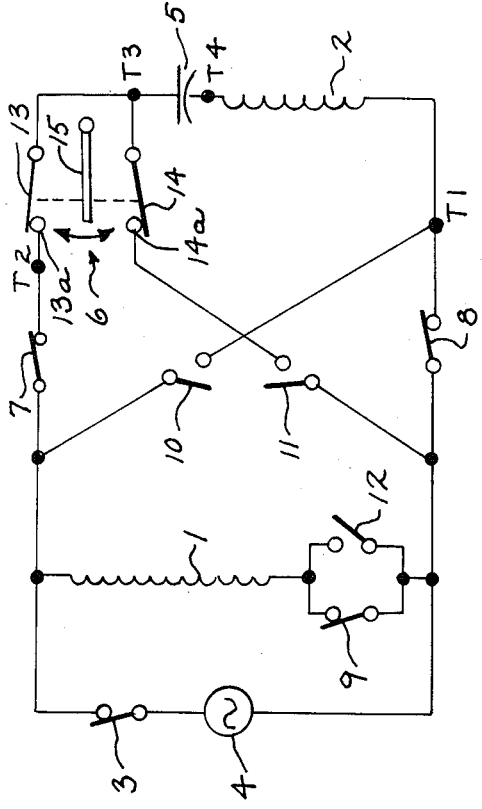
FIG. 1 schematically shows a reversing switch arrangement known in the prior art.

FIG. 1 shows a known capacitor start motor starting system, and including a reversing circuit. Main winding 1 and auxiliary winding 2 of the single phase AC motor are connected through main power switch 3 to an AC power source 4. Capacitor 5 provides additional phase shift for starting torque. When the motor reaches a given threshold speed, switch 6 is opened to disconnect auxiliary winding 2 from power source 4.

Various types of switches 6, and controls therefore, are known. In one arrangement, a mechanical switch and centrifugal actuator are mounted on the motor shaft or rotor. At a given threshold speed, centrifugal weights are displaced radially outwardly to open the switch. A particular type of mechanical centrifugal switch which may be used in reversing applications is commonly known as an "iron fireman" switch as used in the hoist industry. Another example of switch 6 is a General Electric Reverswitch R98-1, 8422.

FIG. 1 shows an up condition of switch 6, with external user operated up switches 7, 8 and 9 closed, and external user operated down switches 10, 11 and 12 open. In this configuration, the same polarity voltage from source 4 is applied to both windings 1 and 2, and current flows in the same direction through the windings during each half cycle. Switch 6 is a mechanical direction sensitive centrifugal switch and is closed when the motor is at rest and during starting, and opens when the motor reaches a designated speed, to disconnect auxiliary winding 2 from the AC power source 4.

Switch 6 includes a first cantilever contact arm 13 normally engaging stationary contact 13a. Switch 6 includes a second cantilever contact arm 14 normally engaging stationary contact 14a. At rest and during starting when the centrifugal switch is closed it holds a wiper actuator 15 out of engagement with contact arms 13 and 14. During starting when the motor begins to rotate, it frictionally drags wiper actuator 15 to a first position depending on the direction of rotation, for example clockwise in FIG. 1 to a position adjacent contact arm 13. When the motor reaches the designated speed and the centrifugal actuator operates, it actuates wiper actuator 15 such that the latter moves to strike contact arm 13 to disengage it from contact 13a and open contacts 13 and 13a, to thus disconnect auxiliary winding 2 from AC source 4. The motor is now in its running condition.

During the above noted running condition, contacts 14 and 14a are closed, but are in an open circuit because down switches 10 and 11 are open. When the user manually operates the reversing switch to its down position, up switches 7, 8 and 9 are opened, and down switches 10, 11 and 12 are closed. This connects main and auxiliary windings 1 and 2 in opposite polarity relation to the AC power source. For example, during the first half cycle of AC power source 4, current flows downwardly through main coil 1. Also during such first half cycle, current flows from AC power source 4 downwardly through closed switch 10, then upwardly through auxiliary winding 2, capacitor 5, and then through contact arm 14 and contact 14a and then downwardly through closed switch 11. Reverse torque is thus applied to the motor, and the motor slows down to zero speed and then accelerates in the opposite direction of rotation. When the motor slows down below a designated speed (cut-in), the centrifugal switch closes which moves wiper actuator 15 out of engagement with contact arm 13, allowing contacts 13 and 13a to re-close (these contacts are in an open circuit because switches 7 and 8 are open). When the motor begins rotating in the opposite direction, it frictionally drags wiper actuator 15 in such opposite direction, e.g., counterclockwise in FIG. 1, to a second position adjacent contact arm 14. When the motor reaches a designated speed (cut-out) in such opposite direction of rotation, the centrifugal actuator operates and actuates wiper actuator 15 such that the latter moves to strike contact arm 14 to disengage it from stationary contact 14a, and thus open contacts 14 and 14a to disconnect start winding 2 from AC source 4.

Figure 2:
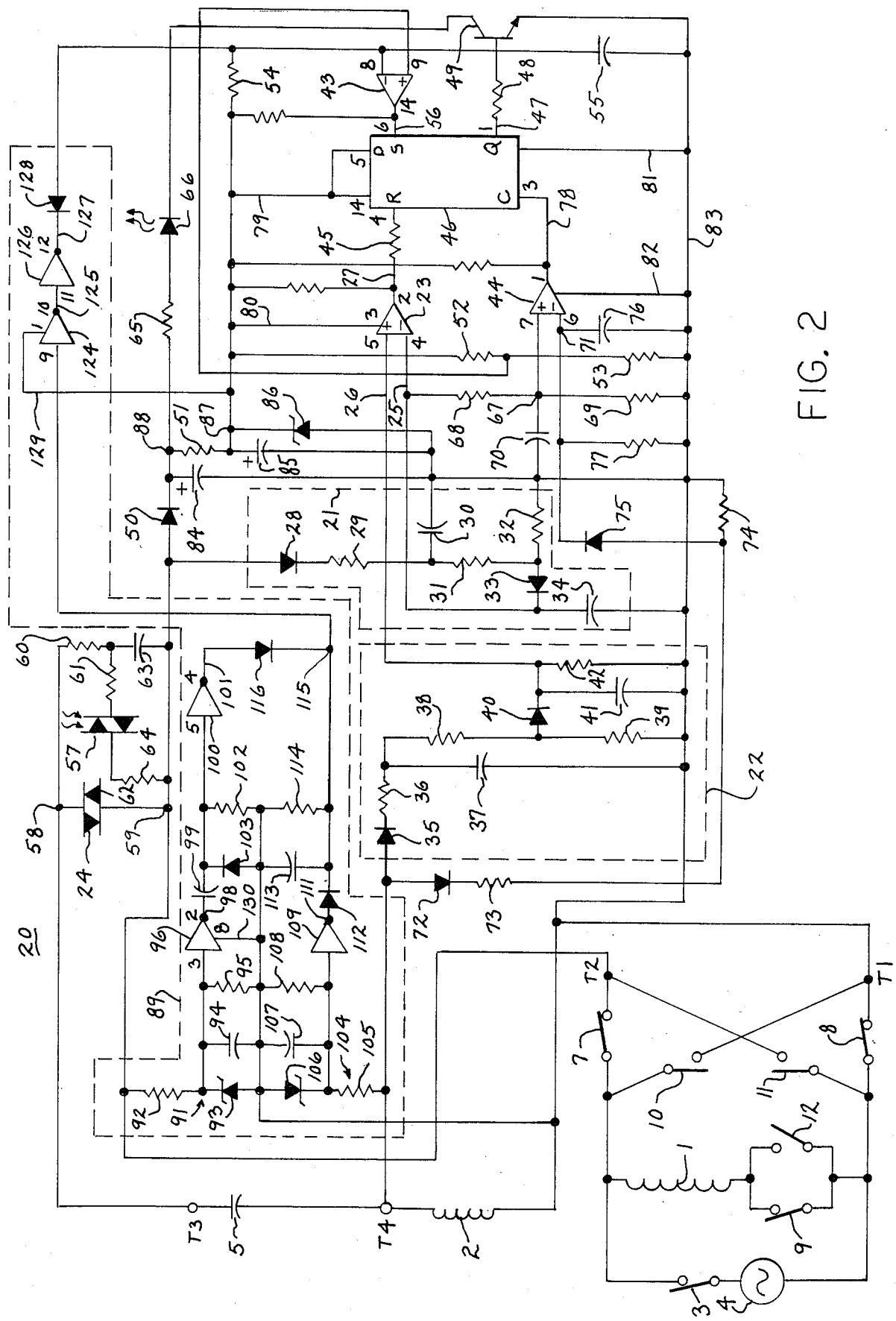
FIG. 2 is a circuit diagram of circuitry constructed in accordance with the invention.

FIG. 2 shows electronic circuitry replacing the mechanical centrifugal type "iron fireman" switch. FIG. 2 uses like reference numerals from FIG. 1 where appropriate to facilitate clarity. In the preferred embodiment, the electronic system of the invention is used in combination with motor starting circuitry similar to that shown in co-pending application Ser. No. 680,489, filed Dec. 11, 1984, relating to a start winding disconnect system sensing and comparing relative magnitudes of main and start winding voltages. The invention may also be used in combination with motor starting circuitry shown in: co-pending application Serial No. 680,488, filed Dec. 11, 1984, relating to a start winding disconnect system utilizing the phase difference between main and start winding voltages; co-pending application Ser. No. 736,454, filed May 21, 1985, relating to automatic multiple bumping (reconnections) of the start winding according to sensed start winding voltage after a predetermined condition disconnect, which may be a time delay type disconnect; and co-pending application Ser. No. 634,699, filed July 26, 1984, relating to a time delay disconnect circuit for the start winding, with decreasing trigger pulse width.

Circuitry 20 in FIG. 2 is connected to terminals T1, T2, T3 and T4 as shown, corresponding to the same terminals T1–T4 in FIG. 1 of the user operated double throw multipole reversing switch. Main voltage detector circuit 21 senses the magnitude of main winding voltage. Auxiliary voltage detector circuit 22 senses the magnitude of auxiliary winding voltage. Voltage comparator 23 is responsive to the main and auxiliary voltage detectors 21 and 22 and responds to a given relation between the magnitudes of the main and auxiliary winding voltages to turn off start switch 6, FIG. 1, such as a triac 24, FIG. 2, to be described, to disconnect auxiliary winding 2 from AC source 4.

The magnitude of the AC auxiliary winding voltage across terminals T4 and T1 increases with increasing motor speed. Voltage comparator 23 responds to the detected main and auxiliary voltage signals on lines 25 and 26, respectively, and generates a turn-off or disconnect signal on line 27 when the magnitude of the AC auxiliary winding voltage across terminals T4 and T1, including components from AC source 4 and from rotationally induced voltage due to rotor rotation, increases above a predetermined value relative to the magnitude of the AC main winding voltage across terminals T2 and T1.

Main winding voltage is sensed through rectifying diode 28 resistor 29 and filtering capacitor 30, and reduced through the voltage divider formed by resistors 31 and 32, and further sensed through diode 33 and filtered by capacitor 34 to provide the main winding voltage responsive signal on line 25. Auxiliary winding voltage is sensed through rectifying diode 35, resistor 36 and filtering capacitor 37, and reduced by a voltage divider formed by resistors 38 and 39, and further sensed through diode 40, filtering capacitor 41 and resistor 42 to provide the auxiliary winding voltage responsive signal on line 26. Lines 25 and 26 are connected to the inputs of comparator 23, which may be one-fourth of a quad comparator chip, such as an LM 339, and wherein two of the other three comparators on the chip are shown at 43 and 44, and wherein manufacturer designated pin number assignments are shown for clarity.

The output of comparator 23 on line 27 is connected through resistor 45 to the reset input of flip flop 46, such as an MC 14013B flip flop, where manufacturer designated pin number assignments for such logic element are shown for clarity. When the voltage at input pin 5 of comparator 23 increases above a predetermined value relative to the voltage on input pin 4 of comparator 23, the output at pin 2 of comparator 23 goes high. This transition ocurrs when the magnitude of the auxiliary winding voltage responsive signal on line 26 rises above the magnitude of the main winding voltage response signal on line 25. The output of comparator 23 then transitions high on line 27 which resets flip flop 46 such that the latter's Q output goes low on line 47 to provide a turn-off or disconnect signal through resistor 48 to the triac driver. When the signal on line 47 goes low, transistor 49 is no longer biased into conductiofn, which turns off triac 24, to be described. Turn off of triac 24 disconnects auxiliary winding 2 from AC power source 4.

An initialization circuit is provided by comparator 43 comparing main winding voltage sensed through diode 50 and resistor 51 and reduced by the voltage divider formed by resistor 52 and 53, against the main winding voltage sensed through diode 50, resistors 51 and 54 and delayed by initiating capacitor 55. Comparator 43 provides an output pulse on line 56 to the set input of flip flop 46 at initial energization of the motor such that the Q output of the flip flop on line 47 goes high to bias transistor 49 into conduction to turn on switch 6, provided by triac 24, to thus connect auxiliary winding 2 to AC source 4 at initial start up of the single phase AC motor. The pulse on line 56 terminates when the delayed main winding voltage at input pin 8 of comparator 43 rises to the level of the main winding voltage at the other input pin 9 of comparator 43. This delay is determined by the charging time of capacitor 55. After termination of the pulse on line 56, the Q output of flip flop 46 stays high until the turn-off or disconnect signal on line 27 reset flip flop 46 causing the Q output on line 47 to transition low, to turn off transistor 49 and triac 24 and disconnect auxiliary winding 2 from AC source 4.

The start switch 6 function, FIG. 1, is provided by triac 24 and an optically isolated triac driver, as known in the art, for example an MOC 3011. Triac 24 is in series with starting capacitor 5 and auxiliary winding 2 across AC source 4, and has a gate circuit including a light responsive triac 57 for controlling conduction of power triac 24. Triac main terminal 58 is connected to one side of capacitor 5 at terminal T3, and triac main terminal 59 is connected to AC source 4 at terminal T2. When terminal 58 is positive with respect to terminal 59, and triac 57 is conductive, current flows from terminal 58 through limiting resistors 60 and 61 and through triac 57 to the gate 62 of the power triac 24 to bias the latter into conduction such that starting current may flow through triac 24 between terminals 58 and 59. Capacitor 63 and resistor 60 provide a snubber network for optotriac driver 57. Resistor 64 provides a gate stability. The turn-off or disconnect signal on line 47 from flip flop 46 is delivered through resistor 48 to the base of bipolar transistor 49 to bias the latter into conduction which in turn completes a circuit through resistor 65 and light emitting diode 66. LED 66 is optically coupled to light responsive triac 57 to activate the latter and initiate conduction of triac 24.

Comparator 44 compares a reference voltage from node 67 derived from the main voltage responsive signal on line 25 as reduced by the voltage divider network provided by resistors 68 and 69 and filtered by capacitor 70, against a stall condition voltage from node 71 as derived from the auxiliary winding voltage sensed through rectifying diode 72, reduced by the voltage divider provided by resistors 73 and 74 and further sensed through diode 75, filtering capacitor 76 and resistor 77. When the rotationally induced voltage in auxiliary winding 2 drops below a given value relative to the main winding voltage, e.g., as may be the case with an overload or locked rotor condition, the voltage at node 71 at input pin 6 of comparator 44 drops below the reference level of node 67 at input pin 7 of comparator 44, and hence the comparator output at pin 1 on line 78 goes high. The high state of line 78 clocks flip flop 46 such that the latter's Q output on line 47 goes high, thus issuing a turn-on or reconnect signal to transistor 49 and triac 24 to thus restart the motor from the noted stalled condition.

A power supply circuit is connected to AC source 4 across main winding 1 and provides rectified voltage as the power source for flip flop 46 at line 79 and for the quad comparator chip at line 80, which components are referenced at respective lines 81 and 82 to terminal T1 at common reference line 83. The power supply is provided through diode 50 as filtered by capacitor 84 and through resistor 51 filtered by capacitor 85 and clamped by zener diode 86 to provide the power source at node 87. The power supply provided through diode 50 also supplies a high voltage at node 88 to switch driver components 66 and 49.

The start switch circuitry automatically connects and disconnects auxiliary winding 2 to and from the AC source in starting and running modes, respectively. The user operated reversing switch, controlling switches 9-12, reverses the voltage polarity applied to one of the windings relative to the other winding. Detection circuitry 89 electrically senses the polarity reversal during the running mode automatically and instantly reconnects auxiliary winding 2 to the AC power source. This detection circuitry also detects polarity reversal during the starting mode, and maintains connection of the auxiliary winding to the AC source.

Figure 4:
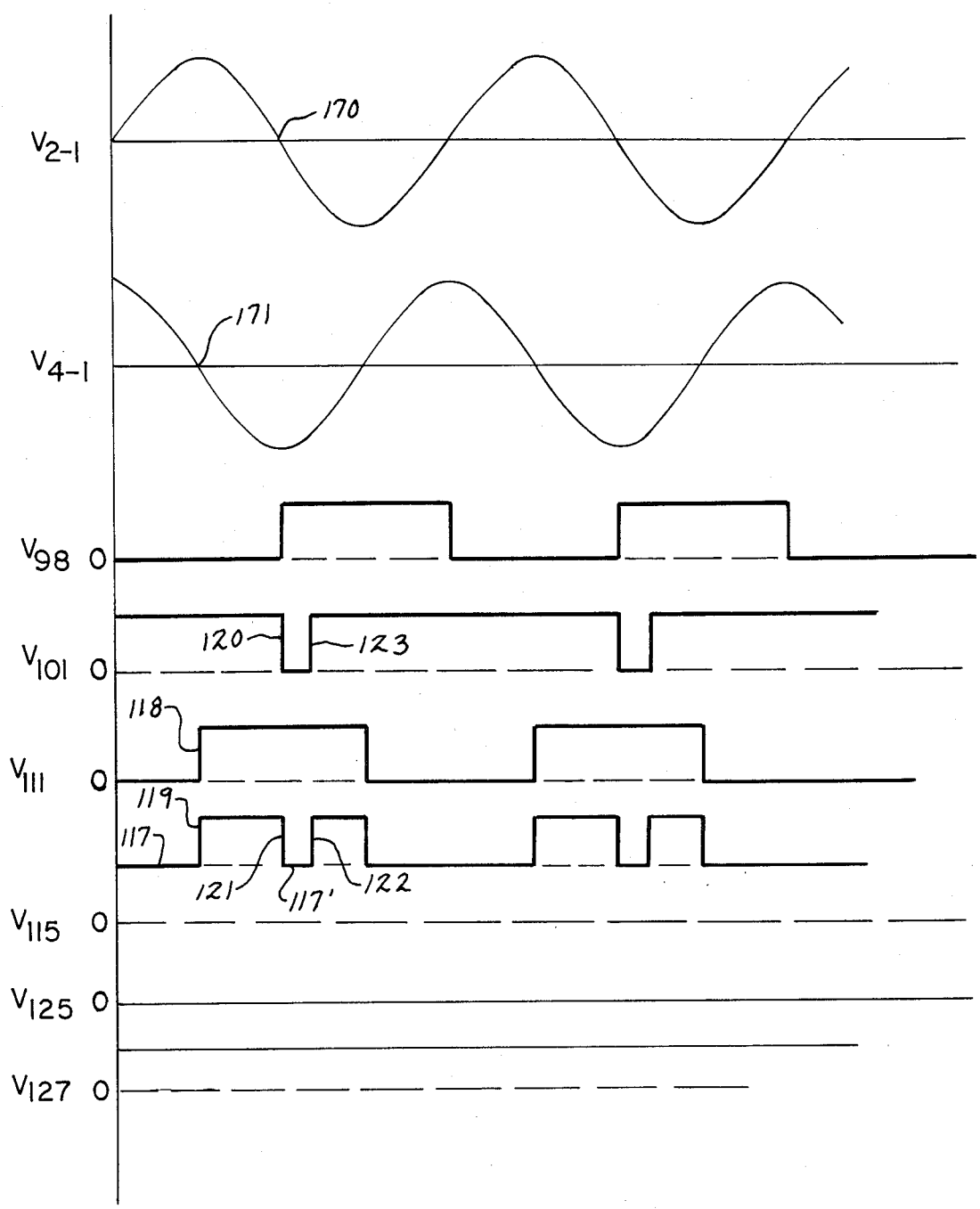
FIG. 4 is a timing diagram illustrating operation of the circuitry of FIG. 2 in the running mode.

A first detector circuit 91, FIG. 2, is connected across the main winding between terminals T2 and T1 and senses main winding voltage through resisor 92 clamped by zener diode 93 and filter by capacitor 94 and resistor 95 and input to an inverting buffer amplifier 96, which may be one-sixth of an MC14049UB chip inverting hex buffer, wherein manufacturer designated pin number assignments are shown for clarity. The timing diagram in FIG. 4 shows at V2-1 the AC waveform across the main winding between terminals T2 and T1. The inverted output of buffer amp 96 on line 98 in FIG. 2, and shown at $V_{98}$ in FIG. 4, is differentiated by capacitor 99 and inverted by buffer amp 100, which may be another sixth of the noted MC14049UB chip, to yield the signal on line 101, as shown as $V_{101}$ in FIG. 4. Resistor 102 and diode 103 provide resistive and reverse protection. Capacitor 99 differentiates the output pulse from buffer amp 96 to shorten its time duration, as shown by the shorter time length pulses $V_{101}$ compared to $V_{98}$, FIG. 4.

A second detector circuit 104 is connected across auxiliary winding 2 between terminals T4 and T1 and senses auxiliary winding voltage through resistor 105 clamped by zener diode 106 and filtered by capacitor 107 and resistor 108 and input to inverting buffer amp 109 which may be another sixth of the noted MC14049UB chip. FIG. 4 shows at $V_{4\text{-}1}$ the voltage across the auxiliary winding between terminals T4 and T1. The inverted output of buffer amp 109 on line 111, FIG. 2, is shown as $V_{111}$ in FIG. 4. The output of buffer amp 109 on line 111 through diode 112 is summed at connection node 115 with the output of buffer amp 100 on line 101 through diode 116, which sum is filtered by capacitor 113 and resistor 114. The sum at node 115 is shown as $V_{115}$.

As seen in FIG. 4, the voltage at node 115 is high at 117 when the high voltage on line 101 is added to the low voltage on line 111. When the low voltage on line 111 transistions high as shown at 118, FIG. 4, the voltage at node 115 transitions yet higher, as shown at 119. When the voltage on line 101 transitions low at 120, the voltage at node 115 transitions down at 121 to its intermediate high level 117' and then transitions back up at 122 to its upper high level when the voltage on line 101 transitions high at 123 at the end of the differentiated pulse provided by capacitor 99.

The summed voltage at node 115 is input to an inverting buffer amp 124 which may be another sixth of the noted MC14049UB chip and which has a threshold voltage slightly less than the intermediate high level 117', such that the output of buffer amp 124 on line 125 remains low regardless of whether node 115 transitions high at 119 or low at 121, as long as node 115 does not drop below the 117' level. The low output of buffer amp 124 on line 125 is shown as $V_{125}$ and is input to another inverting buffer amp 126, which may be another sixth of the noted MC14049UB chip and which outputs a constant high signal on line 127 as shown as $V_{127}$, FIG. 4. Initiating capacitor 55 is connected through diode 128 to the output of buffer amp 126, and the constant high signal on line 127 prevents capacitor 55 from discharging through diode 128. The power supply for the buffer amp MC14049UB chip is provided on line 129 from the power supply node 87, and the buffer amp chip is referenced by line 130 to the common reference return line 83 and terminal T1.

FIG. 4 depicts the condition with switches 7 and 8 closed and switches 10 and 11 open such that the same polarity voltage is applied to main winding 1 and auxiliary winding 2. The auxiliary winding voltage $V_{4\text{-}1}$ between terminals T4 and T1 leads the main winding voltage $V_{2\text{-}1}$ between terminals T2 and T1.

Figure 5:
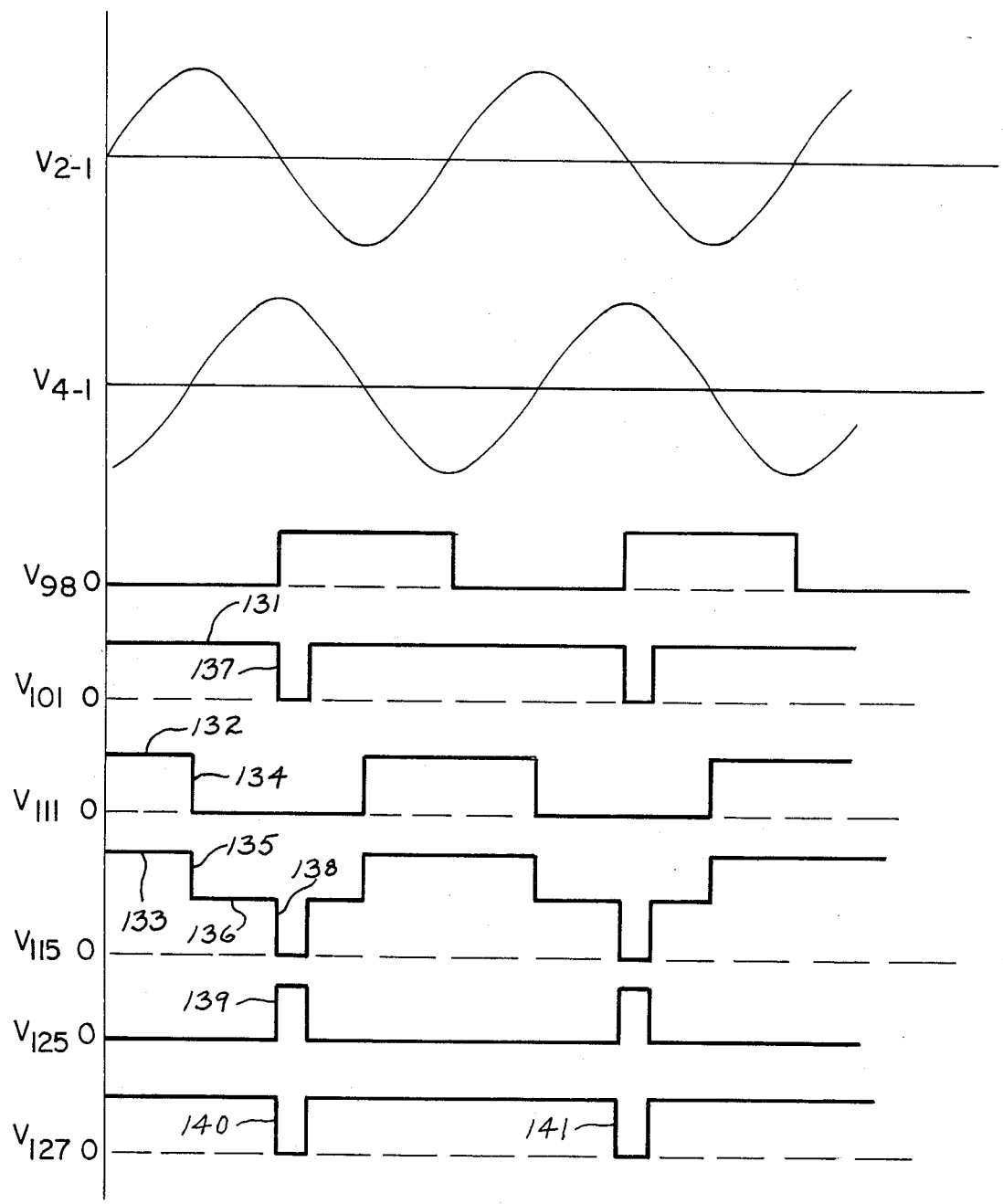
FIG. 5 is a timing diagram illustrating operation of the circuitry of FIG. 2 in the reversed mode.

When the user operates the reversing switch to open switches 7 and 8 and close switches 10 and 11, the relative voltage polarity applied to the main and auxiliary windings is reversed such that an opposite polarity voltage is applied to auxiliary winding 2 relative to main winding 1. The auxiliary winding voltage $V_{4\text{-}1}$ between terminals T4 and T1 now lags the main winding voltage $V_{2\text{-}1}$ between terminals T2 and T1, as shown in FIG. 5. FIG. 5 shows the voltage signals $V_{98}$, $V_{101}$ and $V_{111}$ on lines 98, 101 and 111, respectively, as in FIG. 4, but in their phase displaced relation. Summing the high voltage level 131 of $V_{101}$ with the high voltage level 132 of $V_{111}$ yields the further high voltage level 133 of $V_{115}$. When $V_{111}$ transitions low at 134, the sum at node 115 transitions at 135 to an intermediate high level at 136. When the differentiated signal on line 101 transitions low at 137, the sum at node 115 transitions low at 138 to its zero or other low level. This in turn causes the output of buffer amp 124 on line 125 to transition high at 139 which in turn causes the output of buffer amp 126 on line 127 to transition low at 140. The low state of line 127 discharges capacitor 55 through diode 128.

The discharge of capacitor 55 immediately enables the initiation signal provided by the voltage at input pin 9 of comparator 43 to transition the output on line 56 high to set flip flop 46 and cause its Q output on line 47 to transition high which turns on transistor 49 and triac 24 to reconnect auxiliary winding 2 to AC power source 4. Since switches 7 and 8 are now open and switches 10 and 11 closed, current flows downwardly through main winding 1 and upwardly through auxiliary winding 2 during the first half cycle of AC source 4, and vice versa for the second half cycle. Reverse torque is thus applied to the motor to slow the motor down to zero speed and accelerate it in the opposite direction of rotation. When capacitor 55 is discharged, the voltage at input pin 8 of comparator 43 drops below the voltage at input pin 9 of comparator 43, such that the latter's output goes high. Initiation capacitor 55 thus has a discharged state enabling the initiation signal at input pin 9 of comparator 43 to transition the latter's output, and has a charged state disabling the initiation signal at input pin 9 of comparator 43 from transitioning its output on line 56.

Circuit 89 thus provides a reinitialization circuit detecting the polarity reversal by sensing when one of the main and auxiliary winding voltages shifts from a leading to a lagging position relative to the other of the main and auxiliary winding voltages. When the motor reaccelerates in the opposite direction of rotation, the cutout circuit provided by the main and auxiliary voltage detector circuits 21 and 22 and comparator 23 triggers flip flop 46 to disconnect the auxiliary winding from the AC source at the above noted given value of start winding voltage relative to main winding voltage corresponding to a given motor speed, and the circuit is again ready for another reversing operation.

If the reversing switch is operated by the user during the starting mode with auxiliary winding 2 still connected to AC source 4, the reinitiation signal provided by pulse 140, FIG. 5, still discharges capacitor 55. The initiation signal at input pin 9 of comparator 43 is thus enabled regardless of whether the auxiliary winding is connected or disconnected from AC source 4. The operator may thus start the motor in one direction of rotation and immediately reverse same before the motor reaches its running speed in the first direction.

In some applications involving high inertia loads, the motor may not slow down to zero speed quickly. If the motor speed is not zero, another reinitiation pulse 141, FIG. 5, is generated in the next cycle to again discharge capacitor 55 and hence again enable the initiation signal at input pin 9 of comparator 43 to cause the connection signal to again be generated on line 56 to flip flop 46 and hence reconnect or insure continued connection of the auxiliary winding to AC source 4, such that reverse torque is repeatedly applied to the motor to quickly reduce its speed to zero so that it can accelerate in the opposite direction of rotation.

Figure 3:
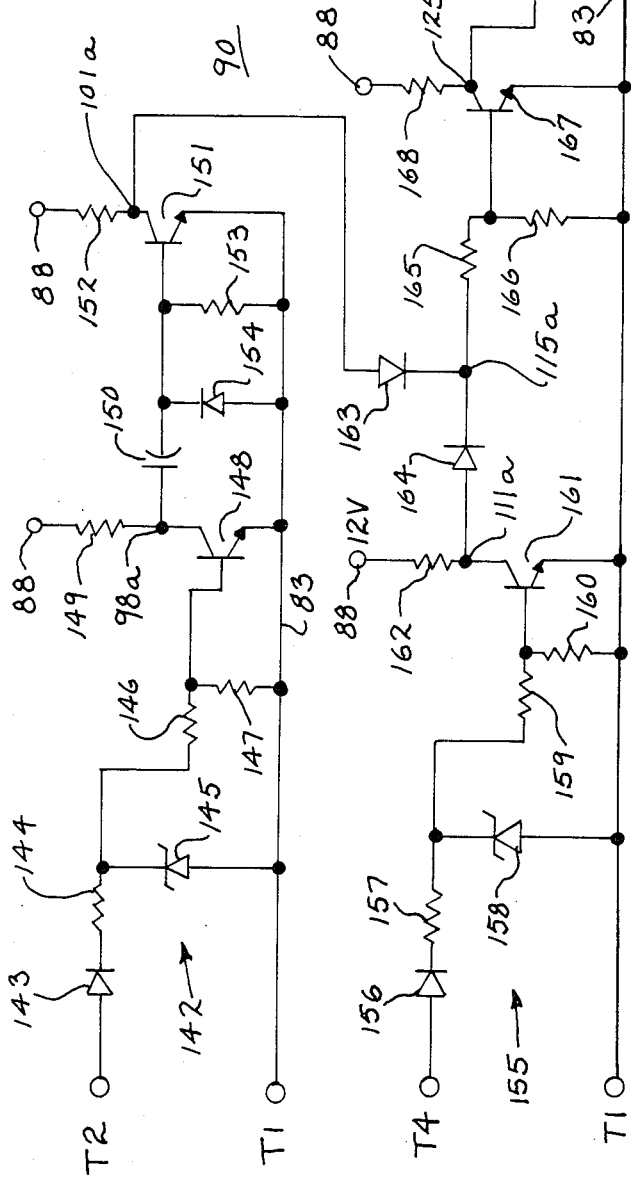
FIG. 3 is an isolated circuit diagram of a modification of a portion of FIG. 2.

FIG. 3 shows another embodiment 90 of the detection and reinitialization circuit 89 of FIG. 2. A first detection circuit 142 is connected across main winding 1 between terminals T2 and T1 and senses main winding voltage through diode 143 and resistor 144 clamped by zener diode 145 and reduced by the voltage divider provided by resistors 146 and 147 and applied to the base of transistor 148. The collector of transistor 148 is supplied with voltage from the power supply node 88 through resistor 149, and the emitter of transitor 148 is connected to the common reference return line 83 and terminal T1. The collector voltage of transistor 148 is comparable to $V_{98}$ on output line 98 of buffer amp 96 in FIG. 2. The collector of transistor 148 has been labeled 98a to facilitate correlation to line 98 in FIG. 2 and to voltage $V_{98}$ in FIGS. 4 and 5. The remaining reference characters with the subscript "a" likewise correlate to the like numbered conductor line in FIG. 2 and like numbered voltage signal timing line in FIGS. 4 and 5. The collector voltage at 98a is differentiated by capacitor 150 and applied to the base of transistor 151 having its collector 101a connected through resistor 152 to the power supply source node 88. Resistor 153 and diode 154 provide resistive and reverse protection.

A second detector circuit 155 is connected across auxiliary winding 2 between terminals T4 and T1 and senses auxiliary winding voltage through diode 156 resistor 157 clamped by zener diode 158 and reduced by the voltage divider provided by resistors 159 and 160 and applied to the base of transistor 161 having its collector 111a connected through resistor 162 to the power supply node 88. The voltages at 101a and 111a are supplied through respective diodes 163 and 164 and summed at connection node 115a. The voltage at node 115a is reduced by the voltage divider provided by resistors 165 and 166 and applied to the base of transistor 167 having its collector 125a connected through resistor 168 to the power supply node 88. The collector voltage of transistor 167 is applied to the base of transistor 168 having its emitter connected to common reference return line 83 and terminal T1 and having its collector 127a connected to the cathode of diode 128 whose anode is connected to capacitor 55 as in FIG. 2. Conduction of transistor 168 in response to reinitiation signal 139, FIG. 5, discharges capacitor 55 through diode 128, as shown at the collector voltage $V_{127}$ transitioning low at 140 in FIG. 5. The voltage level at input pin 8 of comparator 43, FIG. 2, thus drops below the voltage at input pin 9 and output line 56 from comparator 43 transitions high whereby a connection signal is issued to the start switch to reconnect auxiliary winding 2 to AC source 4.

It is thus seen that, in a single phase AC motor having a main winding 1 and an auxiliary winding 2 both connectible to an AC power source 4, and having a start switch 24 for automatically connecting and disconnecting the auxiliary winding to and from the AC source is starting and running modes, respectively, and having a reversing switch 7-12 for reversing the voltage polarity applied from the AC source to one of the windings relative to the other winding, the present invention provides circuitry 89 electrically sensing the polarity reversal and automatically instantly reconnecting auxiliary winding 2 to AC source 4. Circuit 91 provides a first phase detector connected across the main winding and outputting a phase responsive signal at line 101. Circuit 104 provides a second phase detector connected across the auxiliary winding and outputting a second phase responsive signal at line 111. Summing node 115 responds to the first and second phase responsive signals on lines 101 and 111 to actuate the start switch to reconnect the auxiliary winding to the AC source.

The initialization circuit including comparator 43 senses main winding voltage as an initiation signal at input pin 9 of comparator 43 and outputs a connection signal on lines 56 and 47 to the start switch to connect the auxiliary winding to the AC source. Comparator 23 responds to a given condition of the motor, such as a given speed condition as represented by the sensed auxiliary winding voltage at circuit 22 rising above the reference main winding voltage at circuit 21, and outputs a disconnect signal on lines 27 and 47 to disconnect the auxiliary winding from the AC source. Summing node 115, responsive to the first and second phase responsive signals, is connected through buffer amps 124 and 126 and diode 128 to the initialization circuit including comparator 43 and initiation capacitor 55, and outputs a reinitiation signal 140, FIG. 5, on line 127 to the initialization circuit in response to a given condition of the first and second phase responsive signals, and repeats the reinitiation signal, as at 141, FIG. 5, for each cycle of AC source 4 until motor speed is reduced to zero such that reverse torque is repeatedly applied to the motor until the motor speed is reduced to zero and the motor can accelerate in the opposite direction.

Phase detector circuit 91 responds to a zero crossing of main winding voltage, as at 170 in FIG. 4, and outputs a first voltage value. Second phase detector circuit 104 responds to a zero crossing of the auxiliary winding voltage, as at 171, and outputs a second voltage value. Summing node 115 sums the first and second voltage values for yielding the reinitiation signal 140 at a given value of the sum.

As above noted, the initialization circuit includes initiation capacitor 55 having a discharged state enabling the initiation signal at input pin 9 of comparator 43 to transition its output on line 56, and having a charged state disabling such initiation signal, i.e., holding output line 56 low. Capacitor 55 is charged by the voltage across main winding 1 through diode 50 and resistors 51 and 54. At initial energization of the motor from rest, capacitor 55 is uncharged, and the initiation signal at input pin 9 of comparator 43 from the main winding voltage is enabled to transition the output of comparator 43 on line 56 high such that a connection signal is provided on lines 56 and 47 and output to start switch 49 and 24 to connect the auxiliary winding to the AC source. Capacitor 55 then charges to a given threshold and disables the iniation signal at input pin 9 of comparator 43, i.e., the voltage at input pin 8 rises above that at input pin 9, and output line 56 transitions low. Flip flop 46 remains set and its Q output on line 47 remains high such that the auxiliary winding remains connected to the AC source. The reinitiation signal 140, FIG. 5, on line 127, FIG. 2, discharges capacitor 55 to again enable the initiation signal at input pin 9 of comparator 43, regardless of whether auxiliary winding 2 is connected or disconnected to or from the AC source.

Flip flop 46 responds to the initialization circuit including comparator 43 to output a connection signal on line 47 to the start switch to connect the auxiliary winding to the AC source. The cut-out circuit responds to a given condition of the motor, such as a timed delay after initialization, or a given speed as in the preferred embodiment as sensed by comparator 23 comparing the auxiliary winding voltage against the main winding voltage as a function of motor speed. Flip flop 46 also responds to such cut-out circuit to output a disconnect signal on line 47 transitioning low to disconnect the auxiliary winding from the AC source at the noted given condition. Flip flop 46 is also responsive to the reinitialization circuit 89 to output a connection signal on line 47 to the start switch immediately upon the polarity reversal occurring upon user actuation of reversing switch 7-12. Flip flop 46 also responds to comparator 44 to output a reconnect signal on line 47 to the start switch to reconnect the auxiliary winding to the AC source in response to the above noted given decrease in rotationally induced voltage in the auxiliary winding corresponding to a stall condition during running of the motor.

It is recognized that various equivalents, alternatives and modifications are possible within the scope of the appended claims.

I claim:

1. In a single phase AC motor having a main winding and an auxiliary winding both connectable to an AC power source, and having a start switch for automatically connecting and disconnecting said auxiliary winding to and from said AC source in starting and running modes, respectfully, and having a user operated reversing switch for reversing the voltage polarity applied from said AC source to one of said windings relative to the other of said windings, the improvement comprising means electrically sensing said polarity reversal during said running mode and automatically reconnecting said auxiliary winding to said AC source.

2. The invention according to claim 1 wherein said sensing means comprises:
   a first phase detector circuit connected across said main winding and outputting a first phase responsive signal;
   a second phase detector circuit connected across said auxiliary winding and outputting a second phase responsive signal; and
   means responsive to said first and second phase responsive signals to actuate said start switch to reconnect said auxiliary winding to said AC source.

3. The invention according to claim 2 comprising initialization means sensing main winding voltage as an initiation signal at initial energization of said motor from rest and outputting a connection signal to said start switch to connect said auxiliary winding to said AC source, and means responsive to a given condition of said motor and outputting a disconnect signal to said start switch to disconnect said auxiliary winding from said AC source, and wherein said means responsive to said first and second phase responsive signals is connected to said initialization means and outputs a reinitiation signal to said initialization means in response to a given condition of said first and second phase responsive signals and repeats said reinitiation signal for each cycle of said AC source until motor speed is reduced to zero such that reverse torque is repeatedly applied to said motor until motor speed is reduced to zero and said motor can accelerate in the opposite direction.

4. The invention according to claim 3 wherein said first phase detector circuit responds to a zero crossing of main winding voltage and outputs a first voltage value, said second phase detector circuit responds to a zero crossing of start winding voltage and outputs a second voltage value, and comprising means summing said first and second voltage values for yielding said reinitiation signal at a given value of the sum.

5. The invention according to claim 3 wherein said initialization means comprises an initiation capacitor having a discharged state enabling said initiation signal and having a charged state disabling said initiation signal, and wherein said capacitor is charged by voltage across said main winding, such that at said initial energization of said motor from rest said capacitor is uncharged and said initiation signal is enabled and said connection signal is output to said start switch to connect said auxiliary winding to said AC source, whereafter said capacitor charges to a given threshold and disables said initiation signal, with said auxiliary winding remaining connected to said AC source, and wherein said reinitiation signal discharges said capacitor to again enable said initiation signal regardless of whether said auxiliary winding is connected or disconnected from said AC source.

6. In a single phase AC motor having a main winding and an auxiliary winding both connectable to an AC power source, and having a start switch for automatically connecting and disconnecting said auxiliary winding to and from said AC source in starting and running modes, respectively, and having a user operated reversing switch for reversing the voltage polarity applied from said AC source to one of said windings relative to the other of said windings, control circuitry comprising:
   initialization means sensing main winding voltage at initial energization of said motor;
   reinitialization means sensing said polarity reversal;
   logic means responsive to said initialization means to output a connection signal to said start switch to connect said auxiliary winding to said AC source;
   cut-out means for disconnecting said auxiliary winding from said AC source in response to a given condition;
   said logic means being responsive to said cut-out means to output a disconnect signal to said start switch to disconnect said auxiliary winding from said AC source at said given condition;
   said logic means also being responsive to said reinitialization means to output a connection signal to said start switch immediately upon said polarity reversal.

7. The invention according to claim 6 wherein said reinitialization means comprises means sensing when one of the main and auxiliary winding voltages shifts from a leading to a lagging position relative to the other of said main and auxiliary winding voltages to detect said polarity reversal.

8. In a single phase AC motor having a main winding and an auxiliary winding both connectable to an AC power source, and having a start switch for automatically connecting and disconnecting said auxiliary winding to and from said AC source in starting and running modes, respectively, and having a user operated reversing switch for reversing the voltage polarity applied from said AC source to one of said windings relative to the other of said windings, control circuitry comprising:
   main voltage detector means for sensing the magnitude of the AC main winding voltage;
   auxiliary voltage detector means for sensing the magnitude of the AC auxiliary winding voltage;

initialization means sensing main winding voltage at initial energization of said motor;

flip flop means responsive to said initialization means to output a connection signal to said start switch to connect said auxiliary winding to said AC source;

voltage comparator means responsive to said main and auxiliary detector means and comparing the magnitude of the auxiliary winding voltage against the magnitude of the main winding voltage;

said flip flop means also being responsive to said voltage comparator means to output a turn-off signal to said switch to disconnect said auxiliary winding from said AC source when the magnitude of the auxiliary winding voltage increases above a predetermined value relative to the magnitude of the main winding voltage as a function of motor speed;

reinitialization means detecting said polarity reversal by sensing when one of the main and auxiliary winding voltages shifts from a leading to a lagging position relative to the other of said main and auxiliary winding voltages;

said flip flop means also being responsive to said reinitialization means to output a connection signal to said start winding immediately when said one of said main and auxiliary winding voltages shifts from a leading to a lagging position relative to said other of said main and auxiliary winding voltages.

9. The invention according to claim 8 wherein said initialization means comprises second voltage comparator means comparing main winding voltage against main winding voltage delayed by capacitor means, to provide an output pulse to said flip flop means at initial energization of said motor, said pulse terminating when said delayed main winding voltage at one input of said second voltage comparator means rises to the level of said main winding voltage at the other input of said second voltage comparator means, and wherein said reinitialization means discharges said capacitor means in response to said one of said main and auxiliary winding voltages shifting from a leading to a lagging position relative to said other of said main and auxiliary winding voltages, such that said voltage at said one input of said second voltage comparator means drops below said voltage at said other input of said second voltage comparator means.

10. The invention according to claim 9 wherein said reinitialization means comprises:

first amplifier means connected across said main winding and generating an output pulse responsive to the phase of main winding voltage;

second amplifier means connected across said auxiliary winding and generating an output pulse responsive to the phase of auxiliary winding voltage;

differentiator means at the output of one of said first and second amplifier means and differentiates the respective output pulse to shorten its time duration;

means summing said differentiated output pulse of said one of said first and second amplifier means with the output pulse of the other of said first and second amplifier means, and connected in circuit with said capacitor means to discharge the latter at a given value of the sum.

11. The invention according to claim 10 wherein said reinitialization means comprises inverter means connected in series between said differentiator means and said summing means such that the latter sums the inverse of the differentiated output pulse of said one of said first and second amplifier means with the output of the other of said first and second amplifier means.

12. The invention according to claim 9 wherein said reinitialization means comprises:

first transistor means having its base and one of its emitter and collector connected across one of said main and auxiliary windings;

second transistor means having its base and one of its emitter and collector connected across the other of said main and auxiliary windings;

differentiating capacitor means connected to the other of said emitter and collector of said first transistor means;

means summing the differentiated voltage of said other of said emitter and collector of said first transistor means with the voltage of the other of said emitter and collector of said second transistor means, and connected in circuit with said first mentioned capacitor means of said initialization means to discharge first mentioned capacitor means at a given value of the sum.

13. The invention according to claim 12 comprising third transistor means having its base and one of its emitter and collector connected between said differentiating capacitor means and said summing means to invert the differentiated voltage summed with the voltage of said other of said emitter and collector of said other of said emitter and collector of said second transistor means.

14. In a single phase AC motor having a main winding and an auxiliary winding both connectable to an AC power source, and having a start switch for automatically connecting and disconnecting said auxiliary winding to and from said AC source in starting and running modes, respectively, and having a user operated reversing switch for reversing the voltage polarity applied from said AC source to one of said windings relative to the other of said windings, control circuitry comprising:

main voltage detector means for sensing the magnitude of the AC main winding voltage;

auxiliary voltage detector means for sensing the magnitude of the AC auxiliary winding voltage;

first voltage comparator means responsive to said main and auxiliary voltage detector means and comparing the magnitude of the auxiliary winding voltage against the magnitude of the main winding voltage;

flip flop means responsive to said first voltage comparator means to output a disconnect signal to said start switch to disconnect said auxiliary winding from said AC source when the magnitude of the auxiliary winding voltage increases above a predetermined value relative to the magnitude of the main winding voltage as a function of motor speed;

initialization means sensing main winding voltage at initial energization of said motor, comprising second voltage comparator means comparing main winding voltage against main winding voltage delayed by capacitor means, to provide an output pulse to said flip flop means at initial energization of said motor, said pulse terminating when said delayed main winding voltage at one input of said second voltage comparator means rises to the level of said main winding voltage at the other input of said second voltage comparator means;

said flip flop means also being responsive to said output pulse of said initialization means to output a connection signal to said start switch to connect said auxiliary winding to said AC source and continuing said connection signal after termination of said output pulse from said second voltage comparator means;

third voltage comparator means comparing a reference voltage derived from said AC source against a stall condition voltage derived from rotationally induced voltage in said auxiliary winding during said running mode of said motor after starting and after said auxiliary winding is disconnected from said AC source;

said flip flop means also being responsive to said third voltage comparator means to output a connection signal to said start switch to reconnect said auxiliary winding to said AC source in response to a given decrease in said last mentioned voltage;

reinitialization means detecting said polarity reversal by sensing when one of the main and auxiliary winding voltages shifts from a leading to a lagging position relative to the other of said main and auxiliary winding voltages, and connected to said capacitor means of said initialization means to discharge said capacitor means when said one of said main and auxiliary winding voltages shifts from a leading to a lagging position relative to the other of said main and auxiliary winding voltages, such that said voltage at said one input of said second voltage comparator means drops below the level of said voltage at said other input of said second voltage comparator means.

* * * * *